United States Patent Office 3,074,566
Patented Jan. 22, 1963

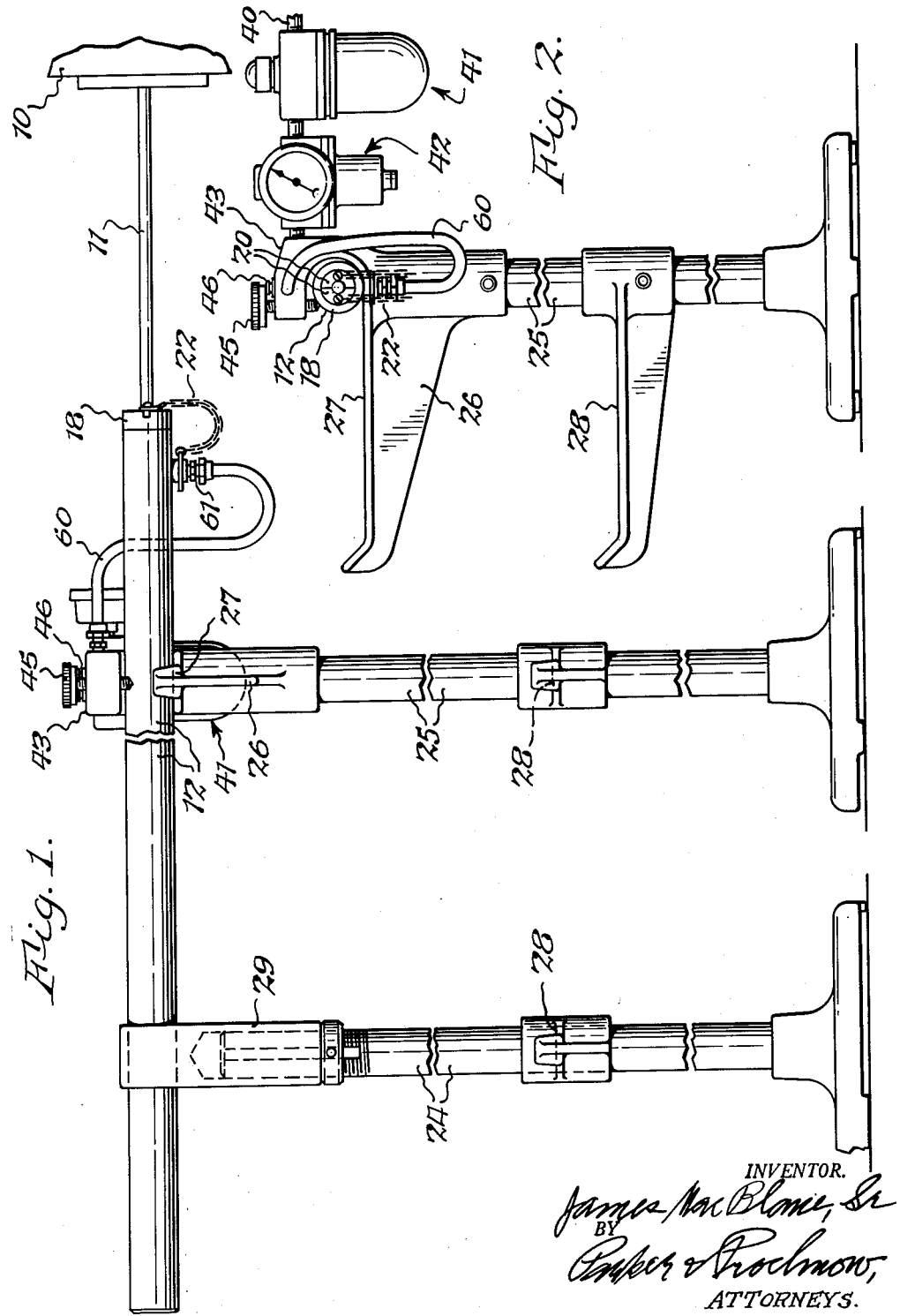

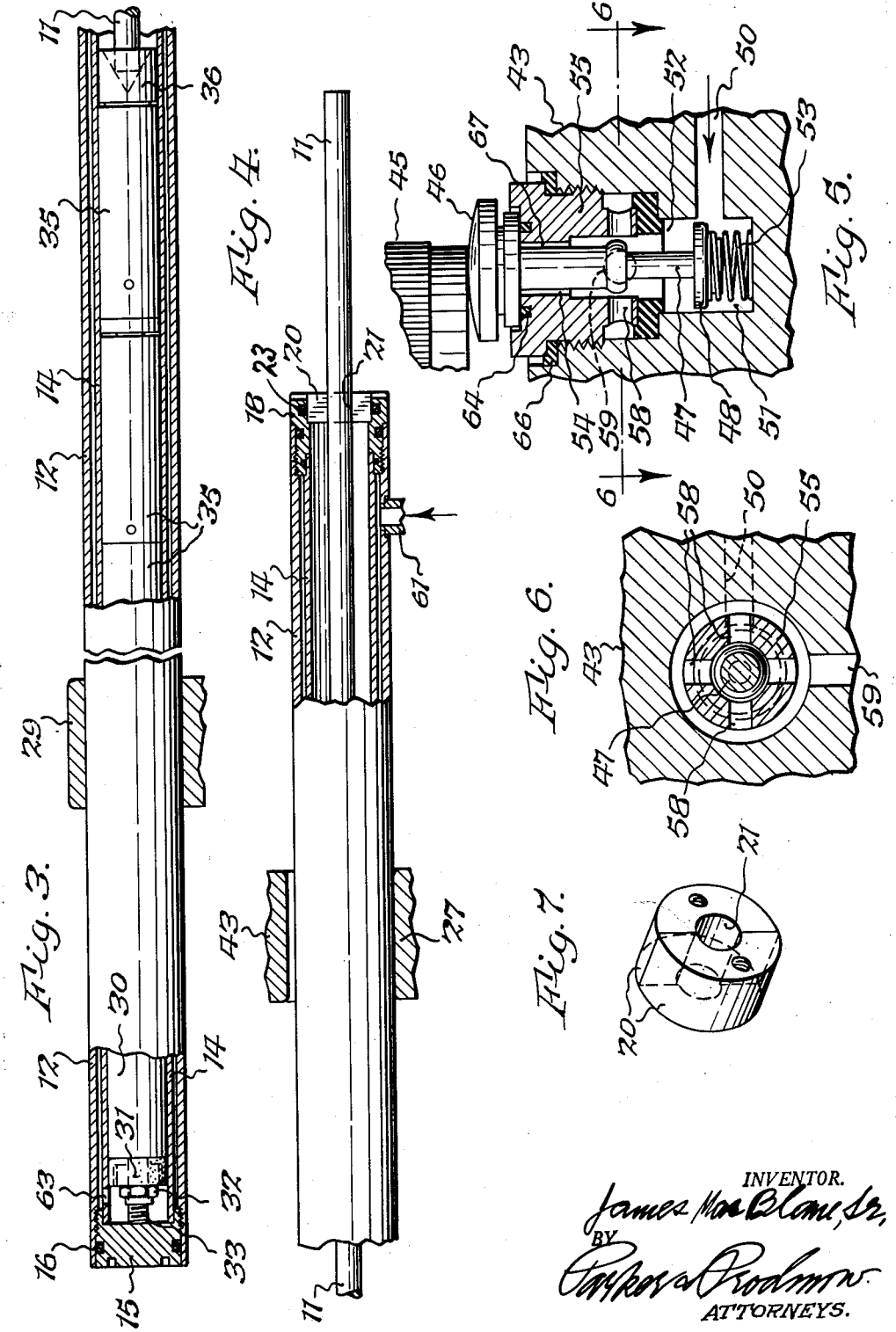

---

3,074,566
BAR STOCK FEED MECHANISM
James MacBlane, Sr., Horseheads, N.Y., assignor to Hardinge Brothers, Inc., Elmira, N.Y.
Filed Apr. 11, 1960, Ser. No. 21,245
5 Claims. (Cl. 214—1.4)

This invention relates to bar stock feed mechanisms for use in connection with metal working machines such as lathes, screw machines or the like. Feed mechanisms of this type include a feed tube and a plunger, the feed tube being alined with a hollow spindle of the lathe or other machine, and the plunger is actuated by fluid pressure to advance the stock.

One of the objects of this invention is to provide an improved mechanism of this type of compact and efficient construction.

It is also an object of this invention to provide means of improved construction for discharging fluid pressure from the feed apparatus when it is desired to place another bar into the feed mechanism.

In the accompanying drawings:

FIG. 1 is a fragmentary front elevation of a feed mechanism embodying this invention showing the same in operative relation to the head stock of a lathe.

FIG. 2 is an end elevation thereof.

FIG. 3 is a fragmentary elevation, partly in section and on an enlarged scale, of a portion of the feed mechanism.

FIG. 4 is a similar view showing the continuation of the feeding mechanism shown in FIG. 3.

FIG. 5 is a fragmentary, central, sectional elevation of a valve for controlling the supply of compressed air to the feed mechanism.

FIG. 6 is a fragmentary, sectional view thereof on line 6—6, FIG. 5.

FIG. 7 is a perspective view of a guide bushing for use in the discharge end of the feed mechanism to guide the bar stock to the machine and to prevent whipping of the bar stock.

In the particular embodiment of this invention shown by way of example in the drawings, 10 represents a portion of the headstock of a lathe and 11 is the bar stock which is being fed to the lathe. The feed mechanism includes an outer tube 12 within which is arranged an inner tube 14 of smaller diameter which forms a cylinder in which a piston or plunger reciprocates. The end of the outer tube 12 is closed by means of a suitable plug 15 extending into the end of this tube and secured thereto by any suitable means such, for example, as screw threads. A gasket 16 is interposed between the plug and the outer tube 12. This plug is provided on the inner face thereof with a bore into which the adjacent end of the inner tube 14 extends to support the same in spaced relation to the outer tube and to form a cylinder head for said inner tube.

At the other or discharge end of the feeding device, I provide a sleeve 18 which also has a threaded connection with the outer tube 12 and which has a bore or recess formed therein to receive the outer end of the inner tube or cylinder 14 and supports this end of the inner tube in fixed relation to the outer tube. The sleeve has an airtight connection with both the inner and outer tubes formed by gasket or packing rings, shown in FIG. 4. The sleeve 18 is formed to receive a bushing 20 which is preferably in two parts, as shown in FIG. 7, the two parts being provided between them with an aperture through which the bar 11 can pass. Since this mechanism is adapted for working on bars of different diameters, a plurality of bushings may be used in connection with the feed mechanism, each having holes 21 of different diameter. The two parts of the bushing are connected with chains or cords 22, the other ends of which are secured to fixed parts of the apparatus, so that when the bushings are forced out of the end of the sleeve 18 they will not be lost and can readily be replaced by bushings having apertures of different sizes.

The two parts of the bushing 20 may be removably held in place in the end of the inner tube 14. In the construction shown for this purpose I have provided the inner bore of the sleeve 18 with a groove in which an O-ring 23 is arranged, the O-ring extending inwardly out of its groove to a sufficient extent to frictionally engage the parts of the bushing 20 so that it can be easily removed and replaced. Preferably there is a stop shoulder in the sleeve which limits the extent to which the bushing may be inserted into the sleeve. The bushing can be made of any suitable material, but may be made of a plastic material, in which case the bushing serves not only to prevent whipping the bar but also to reduce noise resulting from the rotation of the bar in the feed mechanism.

The feed mechanism may be supported in any suitable manner, for example, by means of a pair of standards 24 and 25 which may rest on the floor. The standard 25 has at the upper portion thereof a support 26 provided at the upper end thereof with a platform or shelf 27 on which a part of the outer tube 12 rests and, if desired, a lower platform 28 may be provided to hold stock to be fed to the machine. The other standard 24 is also provided with a lower shelf 28. The upper portion 29 of this standard is provided with a part having an aperture through which the outer tube 12 extends. Both of these standards are adjustable to position the feed device in correct relation to the lathe spindle or other machine tool part which is to receive the bar stock.

30 represents a piston of any suitable type arranged within the inner tube 14. The piston shown is provided at the outer end thereof with a flexible cup or gasket member 31 secured in place in any suitable manner, for example, by means including a nut 32 on a screw threaded stud 33 secured to the piston 30. This stud, in addition to providing means for adjusting the nut 32, also constitutes a stop for abutting against the plug 15 to limit inward movement of the piston into the tube 14. This piston is connected by a plurality of bearing members 35 arranged within the inner tube 14 to a socket 36 which has a substantially conical recess at the outer end thereof in which the ends of the stock bars 11 may seat. The bearing members 35 may be of any usual construction and contain bearings which, if the socket member 36 is rotated because of rotation of the stock, will prevent this rotation from being transmitted back to the piston 30.

In the use of this feed mechanism in connection with a lathe, the socket and some of the bearing members may enter into the spindle of the lathe, and when it is desired to place a new bar into the feed mechanism, the socket 36 and any of the bearing members which have passed out of the inner tube 14 are pushed manually back into this tube, whereupon a new bar may be inserted into the feed mechanism. Bushings 20 of the correct size for the bar stock 11 are then positioned about the bar stock, as shown in FIG. 4. When the bar stock becomes short, the socket member 36 will engage the bushing 20 and move it out of its position for holding the bar so that the socket member 36 and parts attached thereto may enter into the spindle of the lathe. When the bar is so short, it no longer needs the bushing 20 to prevent its whipping.

Pressure fluid, such as compressed air, may be feed to the apparatus from a supply source in any suitable manner, for example, through an inlet pipe 40 leading to a pressure regulator and oiler 41, which may be of any usual or suitable construction and, if necessary, a pressure reducer 42 may be connected in the air line leading to a valve in the head 43 of the standard 25.

The discharge end of the feed mechanism may be swung about a pivotal connection with the standard 24 by moving the discharge end of the same to the left in FIG. 2 along the shelf 27 and out of alinement with the lathe or other machine, when it is desired to place another bar into the tube 14, and when in use the feed mechanism is securely locked in its operative position on its standard. Also it is of course very necessary that the supply of pressure fluid to the piston be interrupted when the feed mechanism is moved to the left in FIG. 2. I prefer to provide a mechanism by means of which the release of the lock which holds the feed mechanism in operative position also automatically interrupts the flow of motive fluid to the piston 30.

The feed mechanism in the construction shown is secured in its operative position on the standard 25 by means of a clamping screw 45 which has a threaded stem extending through a part of the head 43. This screw is so positioned that it engages the outer tube 12 of the feed mechanism at a side thereof, as shown in FIG. 2, so as to clamp the tube within the recess formed by the overhanging head of the standard. This screw 45 has an enlarged head which overhangs a head 46 of a valve rod 47 having an air shutoff valve 48 secured to the lower end thereof and arranged in a cavity in the head 43. The head is provided with an air inlet passage 50 which receives air from the pressure reducer 42 and conducts the air to a chamber 51 into which the valve member 48 is located. This valve formed in the cavity of the head 43 also includes a stationary valve seat 52 against which the valve 48 may seat when the head 46 is permitted to move upwardly by unscrewing the screw 45. The valve 48 in that case is urged upwardly into seating position by means of a spring 53 arranged in the chamber 51 and is held on its seat by the spring and the pressure of the fluid. Consequently, when the screw 45 is rotated in a direction to release the feed mechanism from its operative position shown in FIG. 2, its head will also disengage the valve head 46, thus permitting the valve 48 to be moved into closed position by the spring 53, so that flow of air to actuate the feed mechanism is interrupted. At the same time, any air remaining in the feed device will be exhausted to the atmosphere through a space 54 between the valve stem and a valve body 55 secured in the head 43.

When the screw 45 has been moved into its upper or releasing position, the feed mechanism including the outer tube 12 can then be swung to the left in FIG. 2, out of alinement with the lathe or other machine. When a new bar has been inserted into this tube and into the feed mechanism it is returned to the position shown in FIG. 2, and the screw 45 is moved downwardly to again clamp the outer tube 12 of the feed mechanism in its operative position. When this happens the shut-off valve 48 is moved away from its seat 52, thus permitting air to flow along the valve stem into a transversely extending passage 58 in the valve body 55. This passage connects to another passage 59 in the head 43 which, in turn, connects with one end of a hose or duct 60, the other end of which is connected with a coupling 61 terminating in the outer tube 12. Consequently air from the valve passes through the flexible tube 60 into the interior of the tube 12 and then through a hole or opening 63 in the end of the inner tube 14, through which compressed air passes into the interior of the tube 14 to act on the piston 30.

When the screw 45 is turned down into position to lock the feeding mechanism in its operative position, the head 46 of the valve closes the escape of air from the valve plug 55 by means of a packing ring or gasket 64 against which a part of the valve head 46 bears. The valve body is screwed into a threaded cavity in the head and forms an air-tight closure of this cavity by means of a flexible gasket or ring 66. The valve stem may be guided for axial movement in the valve body in any suitable manner, for example, by radially extending arms 67 leaning against the wall of an axial passage in the valve body 55.

In the operation of this device it will be obvious that when the screw 45 is turned in a direction to release the feed device for movement into a recharging position, the valve 48 is automatically moved into position to shut off the supply of air to the piston 30 and also to bleed off any air pressure remaining in the device, and similarly, by merely moving the screw 45 into position to clamp the feed device in operative position, the valve is restored into its feed position to supply air to the piston.

By arranging the air passage leading to the piston between the two tubes 12 and 14, only a single, relatively short, flexible tube or hose 60 is necessary to control the supply of air to the piston.

It will be obvious that various changes in the details, materials and arrangements of parts which have been herein described and illustrated in order to explain the nature of the invention may be made by those skilled in the art within the principle and scope of the invention as expressed in the appended claims.

I claim:

1. A bar stock feed mechanism including a tube into which a bar may be inserted and which contains a fluid actuated piston for advancing a bar, means for mounting said tube for movement into and out of an operative position, a clamping screw positioned to engage said tube to lock the same in its operative position, a fluid control valve mounted in position to be engaged by said screw when the same is moved into and out of tube-locking position and controlling the supply of fluid to said piston, said valve being closed to stop the flow of fluid to said piston when said screw is moved into position to release said tube.

2. A bar stock feed mechanism including a tube into which a bar may be inserted and which contains a fluid-actuated piston for advancing a bar, a standard for supporting said tube in operative and inoperative positions and having a part which overhangs said tube when in operative position, a clamping member on said overlapping part positioned to move into engagement with said tube when in its operative position and to lock said tube in said operative position, a valve positioned on said overhanging part and having a stem extending into the path of movement of said clamping member and normally urged into closing position, said valve controlling the supply of fluid to said piston, said clamping member being positioned on said overhanging part to disengage said stem when moving out of its clamping position to enable said stem to move into valve-closing position for interrupting the supply of fluid to said piston.

3. A bar stock feed mechanism including a tube into which a bar may be inserted and which contains a fluid-actuated piston for advancing a bar, means for mounting said tube for movement into and out of an operative position, a clamping screw movable into engagement with said tube for holding the same in operative position for feeding a bar, and a fluid control valve for controlling the passage of fluid to said tube to actuate said piston, said valve having a part located in the path of movement of said screw and which is normally urged into closed position, said valve being engaged by said screw when in its tube-clamping position to move said valve into open position, said valve being closed when disengaged by said screw.

4. A bar stock feed mechanism including a tube into which a bar may be inserted and which contains a fluid-actuated piston for advancing a bar, means for mounting said tube for movement into and out of an operative position, a clamping screw for securing said tube in its operative position, and a fluid control valve which is opened by said screw when moved into position to clamp said tube, said valve having a stem extending into the path of movement of said screw, said stem being moved into valve-closing position when said screw is moved in a direction to release said tube.

5. A bar stock feed mechanism including a tube into which a bar may be inserted and which contains a fluid-actuated piston for advancing a bar, means for mounting said tube for movement into and out of an operative position, a clamping screw for securing said tube in its operative position, and a fluid control valve which is opened by said screw when moved into position to clamp said tube, said valve having a stem extending into the path of movement of said screw, said stem being moved into valve-closing position when said screw is moved in a direction to release said tube, said valve having a passage which is opened when said valve is closed to bleed residual air from said tube.

References Cited in the file of this patent

UNITED STATES PATENTS

| | | |
|---|---|---|
| 1,499,460 | Kennedy | July 1, 1924 |
| 1,638,009 | Cambessedes | Aug. 9, 1927 |
| 1,891,953 | Sellars | Dec. 27, 1932 |
| 2,306,075 | Moorman | Dec. 22, 1942 |
| 2,608,746 | Harney | Sept. 2, 1952 |
| 2,810,370 | Fox | Oct. 22, 1957 |
| 2,892,243 | Lanphere | June 30, 1959 |

FOREIGN PATENTS

| | | |
|---|---|---|
| 811,655 | Germany | Aug. 23, 1951 |